United States Patent [19]
Komanduri et al.

[11] Patent Number: 4,627,317
[45] Date of Patent: * Dec. 9, 1986

[54] CONSUMABLE CERAMIC LEDGE TOOL

[75] Inventors: Ranga Komanduri; William R. Reed, Jr., both of Schenectady, N.Y.

[73] Assignee: General Electric Company, Schenectady, N.Y.

[*] Notice: The portion of the term of this patent subsequent to Sep. 10, 2002 has been disclaimed.

[21] Appl. No.: 624,319

[22] Filed: Jun. 25, 1984

[51] Int. Cl.⁴ .......................... B23B 1/00; B23B 27/16
[52] U.S. Cl. ...................................... 82/1 C; 407/113; 407/119; 501/105
[58] Field of Search ................ 407/119, 113; 501/105; 82/1 C

[56] References Cited

U.S. PATENT DOCUMENTS

| 4,286,905 | 9/1981 | Samanta | 407/119 |
| 4,396,724 | 8/1983 | Burden | 501/105 |
| 4,449,864 | 5/1984 | Haque et al. | 407/113 |

FOREIGN PATENT DOCUMENTS

82/02161 7/1982 PCT Int'l Appl. ................ 407/119

Primary Examiner—Francis S. Husar
Assistant Examiner—Jerry Kearns
Attorney, Agent, or Firm—Paul E. Rochford; James C. Davis, Jr.; Paul R. Webb, II

[57] ABSTRACT

The invention is an improvement in ledge tools in that the ledge, or cutting element, is made of alumina-base ceramic material.

12 Claims, 3 Drawing Figures

CONSUMABLE CERAMIC LEDGE TOOL

The invention disclosed and claimed herein was made in the performance of work sponsored by the U.S. Government under Air Force Contract F33615-79-C-5119.

The present invention relates generally to improvements in certain cutting tool insert constructions, which are self-sharpening and have special utility in the machining of hard-to-machine metallic workpieces. The latter cutting tool inserts are described in U.S. patent application Ser. No. 331,341—Lee, et al. filed Dec. 16, 1981. The Lee, et al. application is assigned to the assignee of the instant invention and is incorporated herein by reference.

"Self-sharpening" as the term is used herein and in the Lee, et. al. application means and refers to the unique characteristic of the retention of cutting ability of the cutting element of the tool insert as it is consumed lengthwise during the cutting operation. Thus, unlike heretofore conventional milling and turning cutters, the self-sharpening tool insert constructions of this invention do not require regrinding to sharpen them so that catastrophic escalation of the cutting force does not occur as workpiece material removal proceeds.

High temperature superalloys e.g., nickel-base superalloys such as Inconel 718 (Rc 43–45) used primarily for high temperature resistant (i.e., greater than 1000° C.) parts of a gas turbine engine, are extremely difficult to machine with conventional tool inserts except at low cutting speeds (equal to or less than 100 surface feet per minute, SFPM). For example, the Machining Data Handbook [Machinability Data Center, Metcut Research Associates, Cincinnati, Ohio, page 25 (1972)] recommends the cutting conditions shown in TABLE I using a cemented tungsten carbide (grade C-2 or C-3) tool insert to machine high temperature, nickel-base superalloys (e.g., Inconel 718).

TABLE I

|  | Depth of Cut, (in.) | Feed (in./rev.) | Speed (SFPM) |
| --- | --- | --- | --- |
| Roughing | 0.100 | 0.010 | 80 |
| Finishing | 0.025 | 0.007 | 90 |

With the introduction of new cutting tools such as coated tool inserts, aluminum oxide-titanium carbide ceramic tool inserts and SiAlON (i.e., containing silicon, aluminum, oxygen and nitrogen, these elements being present in large part as aluminum oxide and silicon nitride) ceramic tool inserts, success has been achieved in increasing cutting speeds considerably (e.g., to 400–600 SFPM) in some applications. The main technical limitation to the wider use of these tool inserts at higher cutting speeds has been that ceramic tool inserts can be used only in the round (i.e.,viewed in plan) configuration. There are many applications in which rectangular and triangular tool inserts would be preferred over the round configuration, but presently cannot be used, because of the severe depth-of-cut notch wear encountered in ceramic tool inserts of these shapes. The present invention circumvents this problem and enables the use of all commercial shapes of ceramic tool inserts for machining these materials. In addition, much higher speeds can be utilized with prolonged tool life between insert changes.

A prime advantage of the tool inserts and consumable cutting element configurations disclosed and claimed in Ser. No. 331,341 and of the tool insert of this invention resides in the capability afforded thereby for operation at higher speeds than with conventional tool inserts, while providing a finish of high quality on the machined surface.

DESCRIPTION OF THE INVENTION

This inventions lies in the provision and use of consumable longitudinally-extending cutting elements, that have a ledge configuration and are made of alumina-base ceramics, which cutting elements are of substantially uniform thickness (i.e., about 20 mils to about 60 mils) and they overhang the support means therefor such that they present the flank face for the tool insert at a substantially uniform distance (i.e., about 10 mils to about 60 mils) from the support means.

The remarkable aspects of this invention are that (1) it is possible to machine at all with such thin ceramic cutting elements (ceramics in general being such brittle materials) and (2) beyond a threshold the tougher the alumina-base ceramic materials, the poorer is performance. It is conjectured that the reasons that it has been possible to machine with the ceramic tool insert of this invention are that the thin overhanging ledge configuration acts as a short, rather than a long, cantilever and that the mode of cutting element wear is one of microchipping rather than gross fracture.

At the time of the making of this invention, it was known privately that machining of Inconel 718 had been attempted by others using a ceramic tool insert having an integral consumable cutting element made of aluminum oxide-TiC, an alumina-base ceramic. This tool insert had been made by cutting away stock from a conventional ½"×½"×3/16" ceramic tool insert to produce an overhanging ledge 40 mils thick by 30 mils wide by ¼" long. The test results were negative, due to gross fracture of the cutting element during the machining.

BRIEF DESCRIPTION OF THE DRAWINGS

The features of this invention believed to be novel and unobvious over the prior art are set forth with particularity in the appended claims. The invention itself, however, as to the organization, method of operation and objects and advantages thereof, may best be understood by reference to the following description taken in conjunction with the accompanying drawing wherein:

MANNER AND PROCESS OF MAKING AND USING THE INVENTION

Figure 1:
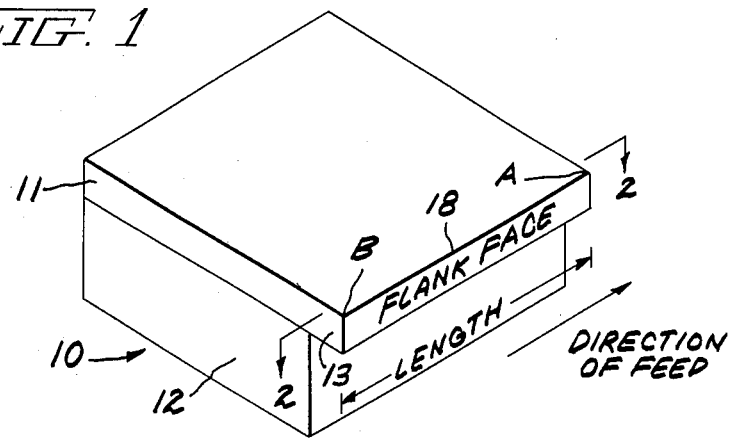
FIG. 1 is a schematic three-dimensional representation of the plate and support assembly providing the consumable cutting element of this invention.
Figure 2:
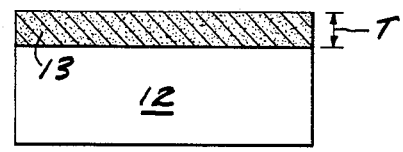
FIG. 2 is a sectional view taken on line 2—2 of FIG. 1.

The arrangement for the tool insert and consumable cutting element of this invention is shown in FIG. 1. Thus, in the assembly 10, the tool insert 11 arranged to project over support member 12 as shown provides longitudinally-extending consumable cutting element 13. Tool insert 11 is preferably in the shape of a flat plate (e.g., a prism) of substantially uniform thickness with substantially parallel opposite major surfaces.

The flank dimension of consumable portion 13 is set by the thickness T (in the range of from 20 mils to 60 mils with a preferred range of 30 mils to 60 mils) of the tool insert 11 while the depth-of-cut (i.e., the flank face is located in the range of from 10 mils to 60 mils from support 12 with the preferred range being from 15 mils to 50 mils is set by the extent of overhang of the tool insert provided.

Figure 3:
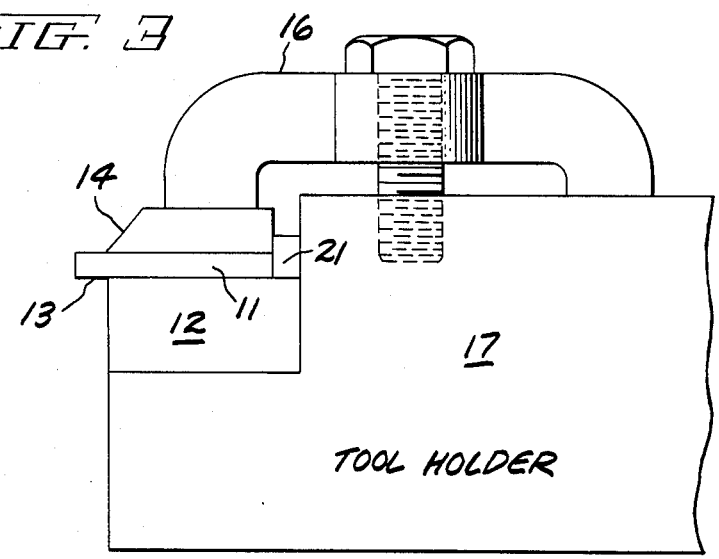
FIG. 3 is a schematic side view in elevation of a tool insert of this invention together with the supporting block therefore clamped in tool holder.

As is shown in FIG. 3, plate 11 is placed upon support block 12 and is held in place by chip breaker 14 and clamp 16 in tool holder 17. The portion of plate 11 overhanging support block 12 provides the properly dimensioned ledge, or flange, 13 (i.e., the cutting element portion), which is to be consumed in the lengthwise direction thereof during use in the machining operation.

During the machining operation (i.e., turning or milling) the tool holder is positioned in its conventional retaining means so as to position the tool insert in accordance with the preferred practice of the method described in Ser. No. 331,341. Thus, with the direction of feed shown, when the leading end A of the top front edge 18 of the cutting element 13 is in contact with the workpiece (not shown), the trailing end B of the top front edge 18 is out of contact with the workpiece sufficient to provide a clearance angle of 1° C or less between the cutting flange 13 and the workpiece. During the machining operation, cutting element 13 is more or less continuously worn away along its length so that flange 13 disappears progressively (i.e., as point A moves towards point B) until the cut is completed or until the flange is no longer available. Functionally, as the cutting proceeds along the length of projecting flange 13 a roughing cut is made followed by a finishing cut immediately thereafter executed by a continually advancing short length of the top front edge 18, where contact is made with the workpiece at the apex of the clearance angle. What is particularly important is that during the wear-back of ceramic element 13, the wear phenomenon with the alumina-base material is one of brittle microchipping and the tool continues to perform efficiently.

An important aspect of this invention has been the unexpected effectiveness of the alumina-base ceramic consumable cutting elements described hereinabove in the high-speed machining (about 1000 SFPM) of nickel-base superalloys, exemplified by Inconel 718. It has been found that machining with these tool inserts results in good surface finish (approximately 2 to 3 micrometers) on the workpiece accompanied by improved tool life.

In the tests reported in TABLE II each tool insert was a ½"×½" plate of thickness equal to the ledge thickness recited. The tool insert was supported in each case on a cemented carbide base and was held in place by a carbide chipbreaker and clamp as shown in FIG. 3. Spacer block 21 was dimensioned so as to have the flank face overhang the support by the desired amount, 30 mils in all cases. In most cases, the depth-of-cut (DOC) was the same as the overhang. Each of tests 6–8 actually reflect several tests and for that reason, a range of cutting times is reported.

TABLE III presents the results of single point tests with commercially available ½"×½"×3/16" ceramic tool inserts.

In all tests, the workpiece (6 inches in diameter×2 feet long) was Inconel 718 solution treated and aged (Rc 43–45); the machine tool was a 15 horsepower Lodge and Shipley lathe, and the cuts were made using Cimcool 400 lubricant.

TABLE II

| TEST NO. | TOOL MATERIAL | LEDGE SIZE (INCH) OVERHANG × THICKNESS | CUTTING CONDITIONS SPEED (FT./MIN.) | DOC (INCH) | FEED (INCH) | CUTTING TIME | WEAR-BACK (INCH) | REMARKS |
|---|---|---|---|---|---|---|---|---|
| 1 | *Cemented Carbide | 0.03 × 0.04 | 600 | 0.03 | 0.008 | 30 sec. | 0.236 | Rapid tool wear |
| 2 | Cemented Carbide | 0.03 × 0.04 | 1000 | 0.03 | 0.008 | 3 sec. | — | No cutting after 3 sec. - rubbing wear length 0.36 in. |
| 3 | **SiAlON Ceramic | 0.03 × 0.04 | 1000 | 0.03 | 0.008 | 1 min +1 min. +30 sec. | 0.1 0.177 0.295 | Uniform wear-back |
| 4 | SiAlON Ceramic | 0.03 × 0.04 | 1500 | 0.03 | 0.008 | 30 sec. +30 sec. | 0.1 0.206 | More rapid wear-back than in 3. |
| 5 | SiAlON Ceramic | 0.03 × 0.03 | 1000 | 0.03 | 0.008 | 1 min. | 0.230 | Rapid wear-back |
| 6 | SiAlON Ceramic | 0.03 × 0.06 | 1000 | 0.015 | 0.008 | 1.5 to 2 min. | 0.040 in/min. | Marginal Performance |
| 7 | SiAlON Ceramic | 0.03 × 0.06 | 1000 | 0.03 | 0.008 | 1.5 to 2 min. | 0.0735 in/min. | Marginal Performance |
| 8 | SiAlON Ceramic | 0.03 × 0.06 | 1500 | 0.03 | 0.008 | 1.5 to 2 min. | 0.15 in/min. | Marginal Performance |
| 9 | ***Carboloy ® Grade 460 Alumina Ceramic | 0.03 × 0.04 | 1000 | 0.03 | 0.008 | 1 min. +1 min. +1 min. | 0.053 0.109 0.206 | Good performance |
| 10 | Carboloy ® Grade 460 Alumina Ceramic | 0.03 × 0.037 | 1000 | 0.03 | 0.008 | 1 min. +30 sec. +1 min. | 0.026 0.088 0.156 | Good performance |
| 11 | Alumina + TiC Ceramic | 0.03 × 0.04 | 1000 | 0.015 | 0.010 | 7 min. | 0.200 | Excellent performance |
| 12 | Alumina + TiC Ceramic | 0.03 × 0.04 | 1000 | 0.03 | 0.008 | 1 min. | No wear-back | Good Performance |
| 13 | Alumina + TiC Ceramic | 0.03 × 0.04 | 1500 | 0.03 | 0.008 | 15 sec. | 0.118 | Rapid wear-back |

*Carboloy ® Grade 883 cemented carbide
**Si + Al + O + N present predominately as $Al_2O_3$ and silicon nitride
***About 90% by wt. $Al_2O_3$; less than 10% by wt. $ZrO_2$; W present in small amount

TABLE III

| TEST NO. | TOOL MATERIAL | CUTTING CONDITIONS | | | TOOL WEAR | | | |
|---|---|---|---|---|---|---|---|---|
| | | SPEED (FT./MIN.) | DOC (INCH) | FEED (INCH) | UFW (INCH) | LOC. WEAR (INCH) | CUTTING TIME | REMARKS |
| 1 | *SiAlON Ceramic | 1000 | 0.03 | 0.008 | 0.024 | — | 30 sec. | Rake spall, nose fracture |
| 2 | SiAlON Ceramic | 1000 | 0.03 | 0.008 | 0.024 | 0.042 | 40 sec. | Rake spall |
| 3 | **Carboloy ® Grade 460 Alumina Ceramic | 1000 | 0.03 | 0.008 | 0.007 | 0.042 0.168 | 30 sec. +30 sec. | 0.014" nose wear 0.028" nose wear |
| 4 | Carboloy ® Grade 460 Alumina Ceramic | 800 | 0.03 | 0.008 | 0.007 | 0.070 | 30 sec. | 0.014" nose wear |
| 5 | Carboloy ® Grade 460 Alumina Ceramic z | 1500 | 0.03 | 0.008 | 0.050 | — | 8 sec. | Rake spall |

*Si + Al + O + N present predominately as $Al_2O_3$ and silicon nitride
**About 90% by wt. $Al_2O_3$; less than 10% by wt. $ZrO_2$; W present in small amount
NOTE: UFW is uniform flank wear; LOC. WEAR is localized flank wear.

By correlating the tests results shown in TABLE II with the values for toughness (shown in TABLE IV) guidelines have been developed for the selection of alumina-base ceramics for the practice of this invention.

TABLE IV

| PROPERTIES | SiAlON | $Al_2O_3$ + TiC | $Al_2O_3$ + $ZrO_2$ + W |
|---|---|---|---|
| Transverse Rupture Strength (Ksi) | ~150 | ~125 | ~115 |
| Fracture Toughness | 7 | 6 | 5 |

The Fracture Toughness parameter is designated $K_{IC}$, the units of which are given in Mega Pascals times the square root of meters (MPa·$\sqrt{m}$). This parameter is determined by the indentation fracture method of A. G. Evans and E. A. Charles [J. Am. Ceramic Society, Vol. 59, No. 7–8 (1976) 371–372]. For each of these properties, as is seen in TABLE IV, the higher the value, the more tough the material.

Alumina-base ceramics with values of transverse rupture strength in the range of from about 80 Ksi to about 150 Ksi and values of fracture toughness in the range of from 4 to 7 are, therefore, suitable for the cutting elements of this invention. The preferred alumina-base ceramics for the practice of this invention will have values of transverse rupture strength in the range of from about 90 Ksi to about 135 Ksi and values of fracture toughness in the range of from 4 to 6.

What is claimed is:

1. In a cutting tool arrangement in which a tool insert is rigidly held in a tool holder, said tool holder being adjustably mounted so as to bring said tool insert into contact with a metal workpiece to alter the shape thereof by the removal of metal therefrom; said tool insert being a flat plate of substantially uniform thickness in the range of from 20 mils to 80 mils; said plate being fixedly disposed on a separate support therefor in overhanging relationship therewith to define a cutting element portion of said plate, said cutting element portion providing flank and rake faces for said tool insert, said flank face of said cutting element portion being located a substantially uniform distance in the range of from 20 mils to 80 mils from said support, said cutting element portion (a) having a maximum thickness in the range of from 20 mils to 80 mils and (b) being progressively consumed along the length thereof during use, the improvement wherein the workpiece is made of a superalloy and said tool insert and, thereby said cutting element, is made of an alumina-base ceramic, the substantially uniform thickness being from 20 mils to 60 mils and the substantially uniform distance being from 10 mils to 60 mils, said alumina-base ceramic having a value for transverse rupture strength in the range of from about 80 Ksi to about 150 Ksi and a value for fracture toughness in the range of from about 4 to about 7.

2. The improvement recited in claim 1 wherein the transverse rupture strength is in the range of from 90 Ksi to 135 Ksi and fracture toughness in the range of from about 4 to about 6.

3. The improvement recited in claim 1 wherein the material of the alumina-base ceramic is alumina-titanium carbide.

4. The improvement recited in claim 1 wherein the material of the alumina-base ceramic is substantially all alumina-zirconia.

5. The improvement recited in claim 4 wherein the alumina-zirconia composition contains a small amount of tungsten.

6. The improvement recited in claim 1 wherein the alumina-base ceramic as a composition is predominately alumina and silicon nitride.

7. The high-speed method for the machining of a metal workpiece of superalloy composition, which comprises the steps of
(a) rigidly mounting a cutting tool relative to said workpiece with a cantilevered longitudinally-extending portion of said tool as the cutting element thereof, the material of said cutting element being an alumina-base ceramic having a value for transverse rupture strength in the range of from about 80 Ksi to about 150 Ksi and a value for fracture toughness in the range of from about 4 to about 7, said cutting element providing the flank and rake faces of said tool with said flank face being located a substantially uniform distance in the range of from 10 mils to 60 mils from any support for said cutting element and having a clearance angle to the workpiece of about one degree or less, said cutting element (a) having a maximum substantially uniform thickness in the range of from 20 mils to 60 mils and (b) being of substantially uniform transverse cross-section along said length;

(b) rotating said workpiece at a speed of at least about 1000 surface feet per minute;
(c) bringing said cutting element against said rotating workpiece with a depth of cut of at least about 0.015 inch and a feed of at least 0.0025 inch per revolution; and
(d) advancing said tool to maintain contact between said cutting element and said workpiece as metal is removed from said workpiece and said cutting element is consumed by wear along the length thereof, said wear being of the brittle microchipping type.

8. The method recited in claim 7 wherein the workpiece is a high temperature superalloy.

9. The method recited in claim 8 wherein the workpiece is a nickel-base superalloy.

10. The method recited in claim 7 wherein the composition of the alumina-base ceramic is selected from the group consisting of alumina-titanium carbide, alumina-zirconia and alumina-silicon nitride.

11. The method recited in claim 7 wherein the finish produced by the machining operation is about 2-3 micrometers.

12. The improvement recited in claim 7 wherein the transverse rupture strength is in the range of from 90 Ksi to 135 Ksi and fracture toughness in the range of from about 4 to about 6.

* * * * *